(12) United States Patent
Masse et al.

(10) Patent No.: US 7,780,901 B2
(45) Date of Patent: Aug. 24, 2010

(54) METHOD FOR MANUFACTURING A PLASTIC FUEL TANK THAT INCLUDES A CONNECTOR PROVIDED WITH A SCREW THREAD

(75) Inventors: Hugues Masse, Brussels (BE); Frederic Jannot, Bousval (BE); Pierre-Francois Tardy, Brussels (BE); Bjorn Criel, Merelbeke (BE); Barbara Mabed, Brussels (BE); Philippe Martin, Herstal (BE)

(73) Assignee: Inergy Automotive Systems Research (S.A.), Brussels (BE)

( * ) Notice: Subject to any disclaimer, the term of this patent is extended or adjusted under 35 U.S.C. 154(b) by 0 days.

(21) Appl. No.: 12/297,061

(22) PCT Filed: Apr. 18, 2007

(86) PCT No.: PCT/EP2007/053769

§ 371 (c)(1),
(2), (4) Date: Oct. 14, 2008

(87) PCT Pub. No.: WO2007/122154

PCT Pub. Date: Nov. 1, 2007

(65) Prior Publication Data

US 2009/0166934 A1 Jul. 2, 2009

(30) Foreign Application Priority Data

Apr. 20, 2006 (FR) .................................. 06 03535

(51) Int. Cl.
*B29C 49/30* (2006.01)

(52) U.S. Cl. .................. 264/531; 264/516; 264/523; 264/524

(58) Field of Classification Search ................. 264/523, 264/524, 516, 531
See application file for complete search history.

(56) References Cited

U.S. PATENT DOCUMENTS 4,176,153 A * 11/1979 Weiler et al. ............... 264/524

(Continued)

FOREIGN PATENT DOCUMENTS

DE 8225986 U1 6/1985

(Continued)

OTHER PUBLICATIONS

U.S. Appl. No. 11/718,161, filed Apr. 27, 2007, Bjorn Criel.

(Continued)

*Primary Examiner*—Joseph S Del Sole
*Assistant Examiner*—Timothy Kennedy
(74) *Attorney, Agent, or Firm*—Oblon, Spivak, McClelland, Maier & Neustadt, L.L.P.

(57) ABSTRACT

Method for manufacturing a plastic fuel tank by moulding a parison in a mould, in which method the parison is locally deformed during moulding of the parison in order to obtain an impermeable hollow built-in connector provided with a screw thread, and to do so by means of a concave counter-form and a convex form that can penetrate the counter-form, these two pieces being secured, one to the mould and the other to a core located inside the mould, or vice versa, and at least one of these pieces being provided with a screw thread, the moulding of the connector taking place by the convex form penetrating the concave counter-form.

10 Claims, 3 Drawing Sheets

U.S. PATENT DOCUMENTS

| | | | | |
|---|---|---|---|---|
| 4,295,811 | A | * | 10/1981 | Sauer .................... 425/112 |
| 4,308,086 | A | * | 12/1981 | Valyi .................... 156/423 |
| 5,866,061 | A | * | 2/1999 | Miyamoto et al. .......... 264/524 |
| 6,626,325 | B1 | | 9/2003 | Humphrey et al. |
| 2001/0015513 | A1 | | 8/2001 | Schaftingen et al. |
| 2002/0043533 | A1 | | 4/2002 | Gombert et al. |
| 2002/0130515 | A1 | | 9/2002 | Mlyajima et al. |
| 2007/0290414 | A1 | * | 12/2007 | Criel .................... 264/531 |
| 2008/0164639 | A1 | | 7/2008 | Criel |

FOREIGN PATENT DOCUMENTS

| | | |
|---|---|---|
| EP | 0875411 A2 | 11/1998 |
| EP | 1110697 A2 | 6/2001 |
| EP | 1145820 A2 | 10/2001 |
| GB | 1410215 A | 10/1975 |
| GB | 2279606 A | 1/1995 |
| JP | 2113919 A | 4/1990 |
| WO | WO2006008308 A1 | 1/2006 |
| WO | WO2006045838 A1 | 5/2006 |
| WO | WO2006064005 A1 | 6/2006 |

OTHER PUBLICATIONS

U.S. Appl. No. 11/721,735, filed Jun. 14, 2007, Barbara Mabed.
PCT International Search Report dated Jul. 12, 2007 for International Application No. PCT/EP2007/053769 (3 p.).
PCT International Preliminary Report dated Oct. 22, 2008 for International Application No. PCT/EP2007/053769 (7 p.).
Search Report dated Jan. 17, 2007 from Institut National De La Propriete Industrielle for French Application No. 06.03535 (2 p.).

* cited by examiner

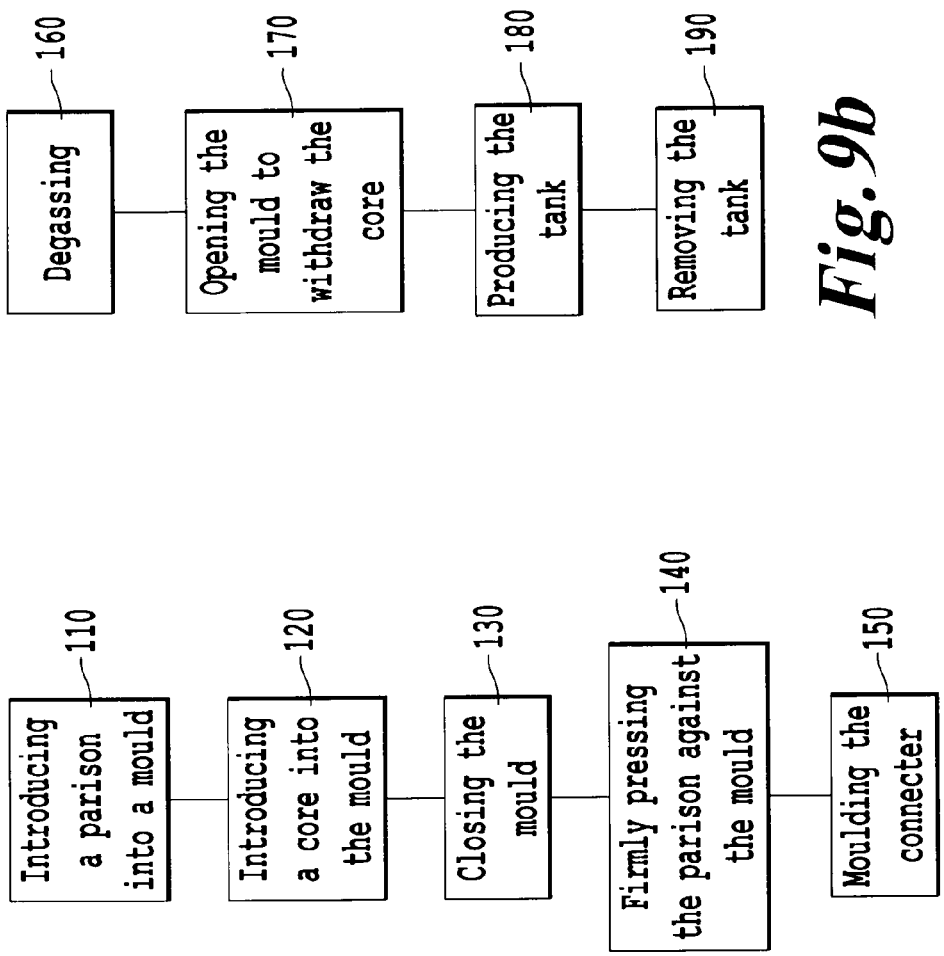
*Fig. 9b*
*Fig. 9a*
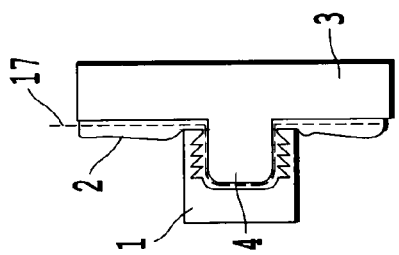
*Fig. 8*

METHOD FOR MANUFACTURING A PLASTIC FUEL TANK THAT INCLUDES A CONNECTOR PROVIDED WITH A SCREW THREAD

CROSS-REFERENCE TO RELATED APPLICATIONS

This application is a U.S. national stage application under 35 U.S.C. §371 of International Application No. PCT/EP2007/053769, filed Apr. 18, 2007, which claims priority to French Application No. 0603535, filed Apr. 20, 2006, each of these applications being incorporated herein by reference for all purposes.

BACKGROUND OF THE INVENTION

1. Field of the Invention

The present invention relates to a method for manufacturing a plastic fuel tank that includes a connector provided with a screw thread. It also relates to a fuel tank that can be obtained by this method.

2. Description of The Related Art

Fuel tanks (FTs) on board vehicles of various kinds generally have to meet imperviousness and permeability standards in relation to the type of use for which they are designed and the environmental requirements that they have to satisfy. Both in Europe and throughout the world we are currently experiencing a considerable tightening of the requirements concerned with limiting the emissions of pollutants into the atmosphere and into the environment in general. The design of fuel tanks is therefore evolving quickly towards techniques capable of better guaranteeing the imperviousness and safety under varying conditions of use. Furthermore, attempts are also being made to minimize the losses originating from the pipes and various accessories connected to the tanks. A means sometimes used has been to incorporate certain accessories and pipes inside the tanks, thus eliminating their interface with the external atmosphere. Preferably, these elements are fastened to the internal wall of the tank and do not pass through it, so as to avoid damaging the barrier layer often present in these tanks and to eliminate the risk of leaks due to the use of sealing devices.

Patent EP 875411 in the name of the Applicant proposes a means of fastening accessories inside a plastic FT by taking advantage of the molten state of the plastic while it is being moulded, which consists in producing a relief in its wall so as to fasten thereto a pump/gauge module provided with a corresponding relief during a finishing operation after the moulding. This relief consists in fact of a dovetail, thereby implying a small volume in the region of the fastening point (in order to be able to slide the component into the relief) and the use of an additional piece or chock for securing/blocking the fastening.

Patent application WO 2006/008308 in the name of the Applicant discloses a method for manufacturing a plastic FT by profiting from the fact that a parison is molten while it is being moulded, in order to fasten accessories directly to it, a core being used to do this. In this method, the accessory is fastened to the parison by snap-riveting, that is to say by the in situ formation of a molten plastic rivet, which is forced through an orifice and left therein to solidify. However, this method entails a residence at high temperature and possibly at high pressure (if the moulding takes place by blow moulding), something which certain "fragile" accessories cannot tolerate from this standpoint. Furthermore, certain accessories are too heavy to be attached hot (there is a risk of deforming the parison). Finally, the fastening obtained is permanent, i.e. it cannot be removed without damaging the tank and/or the component.

DETAILED DESCRIPTION OF THE PREFERRED EMBODIMENTS

The present invention aims to solve these problems by providing a means for fastening accessories to FTs which is reliable, practical and removable, which can fit into a congested area and which can even, in a variant, be suitable for all types of accessories, including those that are fragile and/or heavy.

For this purpose, the invention relates to a method for manufacturing a plastic fuel tank by moulding a parison in a mould, in which method the parison is locally deformed during moulding of the parison in order to obtain an impermeable hollow built-in connector provided with a screw thread, and to do so by means of a concave counter-form and a convex form that can penetrate the counter-form, these two pieces being secured, one to the mould and the other to a core located inside the mould, or vice versa, and at least one of these pieces being provided with a screw thread, the moulding of the connector taking place by the convex form penetrating the concave counter-form.

The term "fuel tank" is intended to denote a sealed tank (i.e. a closed volume bounded by a wall and including at least one opening for filling it) able to store fuel under diverse and varying environmental and usage conditions. An example of this tank is a tank fitted to motor vehicles.

The fuel tank according to the invention is made of plastic.

The term "plastic" denotes any material comprising at least one synthetic resin polymer.

All types of plastic may be suitable. Particularly suitable plastics come from the thermoplastics category.

The term "thermoplastic" denotes any thermoplastic polymer, including thermoplastic elastomers, as well as blends thereof. The term "polymer" denotes both homopolymers and copolymers (especially binary or ternary copolymers). Examples of such copolymers are, non-limitingly, random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10 degrees Celsius are particularly suitable. Examples of such materials include those that exhibit polydispersion in their molecular weight.

In particular, polyolefins, thermoplastic polyesters, polyketones, polyamides and copolymers thereof may be used. A blend of polymers or copolymers may also be used, as may a blend of polymer materials with inorganic, organic and/or natural fillers such as, for example, but non-limitingly, carbon, salts and other inorganic derivatives, natural fibres or polymeric fibres. It is also possible to use multilayer structures consisting of stacked layers bonded together comprising at least one of the polymers or copolymers described above.

One polymer that is often used is polyethylene. Excellent results have been obtained with high density polyethylene (HDPE).

The wall of the tank may be made up of a single layer of thermoplastic or of two layers. One or more other possible additional layers may, advantageously, consist of layers of a material that forms a barrier to the liquids and/or gases. As a preference, the nature and thickness of the barrier layer are chosen in such a way as to limit as far as possible the permeability towards the liquids and gases in contact with the interior surface of the tank. As a preference, this layer is based on a barrier resin, that is to say on a resin impermeable to the fuel such as a PA (polyamide) or an EVOH (a copolymer of ethylene and partially hydrolysed vinyl acetate). Alternatively, the tank may be subjected to a surface treatment (fluoration or sulphonation) the purpose of which is to render it impermeable to the fuel.

Good results have been obtained with a parison (and therefore an FT) having at least one polyolefin-based structural layer and a barrier layer. The present invention applies particularly well to the manufacture of an HDPE-based FT having an EVOH-based barrier layer.

According to the invention, the tank is produced by moulding a parison. A "parison" is intended to mean a preform, generally extruded, which is intended to constitute the wall of the tank once it has been moulded to the required shape and size. This preform does not necessarily have to be made as a single piece.

Thus, advantageously, the parison in fact consists of two separate pieces, which may for example be two sheets. However, as a preference, these pieces result from the cutting of one and the same extruded tubular parison as described in application EP 1110697 in the name of the Applicant and the content of which is, for this purpose, incorporated by reference into this application. According to this variant, once a single parison has been extruded it is cut along its entire length, along two diametrically opposed lines, to obtain two separate parts (sheets).

By comparison with the moulding of two separately extruded sheets, the thickness of which is constant, this approach makes it possible to use parisons of variable thickness (that is to say a thickness that is not constant along their length), obtained by virtue of an appropriate extrusion device (generally an extruder fitted with an adjustable punch die). A parison such as this takes account of the reduction in thickness which occurs during moulding at certain points on the parison, as a result of the non-constant rates of deformation of the material in the mould.

The term "accessory" within the context of the invention is understood to mean a component or a group of components having an active function in the tank, such as ventilation, fuel transfer to the engine, liquid level measurement, reduction of noise associated with sloshing, etc. The invention applies preferably to fragile accessories (gauge, pump/gauge module, electronic unit) and/or heavy accessories (pump/gauge module).

The method according to the invention uses a core. By this is meant a piece of size and shape suitable for being inserted between the impressions (or outer parts) of the mould. Such a piece has for example been described in patent GB 1 410 215, the content of which has for this purpose been incorporated for reference into the present application.

Within the context of the invention, the function of the core is in particular to mould the connector, by cooperating with a suitable relief present on the impressions of the mould.

The core may also serve to inject a pressurized gas into the mould in order to press the parison against the impressions of the mould.

Finally, the core may also be used to at least partly monitor the method. For this purpose, it is possible for example to incorporate a camera into the core so as to display and check the quality of the fastening of the accessories by image analysis. One or more sensors for measuring one or more quantities, such as force, stroke, pressure, temperature, may also be installed on the core so as to better monitor the fastening of the accessories.

According to the invention, the parison is deformed locally in order to mould an impermeable connector intended for fastening an accessory. This moulding preferably takes place without addition of material, using only the constituent material of the parison. The term "connector" is intended to denote within the context of the invention a hollow article having a substantially cylindrical general shape (i.e. a kind of connector) provided with a fastening relief for mechanically fastening the accessory. Within the context of the invention, this relief is a screw thread complementary to a screw thread present on the accessory to be fastened.

The term "impermeable connector" is understood in fact to mean that the wall of the tank is not pierced, that is to say a deformation has simply been impressed on it, preferably a deformation towards the inside of the tank, i.e. towards its internal volume, without either piercing or tearing the wall.

The moulding of the connector is generally performed independently from the moulding of the tank proper. It may take place before or after the latter moulding operation. For practical reasons, it preferably takes place before the tank is moulded, or, in any case, prior to the last step of this moulding operation (which may be the assembling of two shells moulded separately in the same mould for example).

In general, the method according to the invention comprises at least the following steps:
- a parison is introduced into the mould;
- the core is introduced into the mould, inside the parison;
- the mould is closed;
- the parison is pressed firmly against the mould by blowing through the core and/or drawing a vacuum behind the mould; and
- the connector is moulded by displacing the form within the counter-form.

Thus, according to the invention, the moulding of the connector takes place using two complementary pieces: a convex form and a concave counter-form both of suitable shape and size that the form can penetrate the counter-form and, in doing so, mould the connector through local compression of the material. These two pieces are secured one to the core and the other to the mould. What that means is that if the counter-form is secured to the core (in the case of a reentrant connector in the volume of the tank), then the form is secured to the mould, and vice versa (in the case of a connector protruding from the volume of the tank).

These two pieces are therefore, at a given point in time, able to move one relative to the other because the form has to be able to penetrate the counter-form in order to mould the connector. In general, the movement of one of the two pieces is brought about by a suitable device of the hydraulic ram type. This device is advantageously borne by the core (and so too therefore is the moving piece).

The method according to the invention was developed for fastening accessories internal to the tank. However, it is also suitable for fastening accessories external to the tank. In fact, it could even be suitable for moulding a connector having both an internal screw thread (i.e. one on the internal surface of the wall of the tank or directed towards the interior of the volume bounded by the wall) and an external screw thread (i.e. located on the external surface of the wall of the tank or directed towards the outside of the volume bounded by the wall) so as to connect both an internal component and an external component. In this variant, both the form and the counter-form are provided with a screw thread.

According to a variant of the invention, either the form or the counter-form consists in fact of the accessory itself. In this case, the screw thread of the accessory is used for directly deforming the parison and for moulding within it a complementary screw thread. When the accessory acts as of counter-form, the connector obtained is reentrant (and serves for connecting an internal accessory) and when it acts as form, the connector obtained is protruding (and serves for connecting an external accessory). This variant has the advantage that the screwing operation may be omitted, but it has as disadvantage the fact of being unable to be applied to fragile and/or heavy accessories.

According to another variant (which in fact has the opposed advantages and disadvantages), the core includes a hollow moving piece provided with an internal screw thread which acts as counter-form and is unscrewed from the built-in connector once the latter has been moulded.

In this variant, it is advantageous to provide the core with a device that allows said piece to be automatically unscrewed from the formed connector before the core is removed from the mould (so that this piece is removed from the mould before the final thermoforming or blow moulding). In this variant, it is therefore advantageous to cool the counter-form (for example by circulating a coolant) so as to be able to solidify the material on the surface of the connector and to be able to demould it (by unscrewing the counter-form) without damaging it. It should be noted that the mould may also be cooled at the point where its complementary form is, again so as to help in solidifying the constituent material of the connector. It is also advantageous to provide the counter-form with a system for extracting/sucking out the air trapped between the parison and the counter-form so as to ensure that the flights of the screw thread are moulded correctly.

In the method according to the invention, the tank may be moulded by blow-moulding the parison (pressing the parison firmly against the mould using a pressurized fluid (generally air)). In this method, the parison has sometimes already experienced the influence of the pressurized fluid before the connector is blown and/or formed, this being with a view to ensuring that the parison is firmly pressed against the mould. Thus, for example, before blowing and/or moulding the connector, it may prove advantageous to press the parison against the mould by blowing through the core. In consequence, in such an instance, before withdrawing the core from the mould, the mould will need to be degassed in order, in particular, to avoid an excessively sudden expansion of the trapped pressurized fluid, and the accompanying noise.

Also, according to a preferred variant, the method according to the invention comprises the following steps:
  a parison is introduced into the mould;
  the core is introduced into the mould, inside the parison;
  the mould is closed;
  the parison is pressed firmly against the mould cavity by blowing through the core and/or drawing a vacuum behind the mould;
  the connector is moulded by displacing the moving piece within the counter-form;
  the counter-form is unscrewed if this is secured to the core and screwed into the moulded connector;
  degassing is performed;
  the mould is opened to withdraw the core;
  the mould is closed again onto the parison and the parison is blown in order to produce the tank; and
  the tank is removed from the mould. See FIGS. 9(a) and (b).

The degassing step may be done in any appropriate way. In general, the parison is first of all pierced (for example by puncturing it with a needle) and then the fluid is let out of the mould (for example using a valve).

Alternatively, the tank may be moulded by thermoforming the parison (i.e. by pressing the parison (=one or two sheet(s) of molten material) firmly against the wall of the thermoforming mould by drawing a vacuum in the volume between the molten material and the wall of the mould).

The present invention also relates to a plastic fuel tank that can be obtained by a method as described above.

In particular, it relates to a plastic fuel tank that includes an impermeable built-in connector provided with a screw thread, said connector being formed by locally deforming the wall of the tank.

Preferably, this tank includes a barrier layer as defined above, and this barrier layer is also present and continuous (unpierced) in the connector and at the connector/tank transition.

This connector may be reentrant (directed towards the internal volume of the tank) or protruding (constituting an excrescence towards the outside of the tank). It may include an internal screw thread (i.e. one located on the internal surface of the wall of the tank and intended for connecting an internal accessory) and/or an external screw thread (i.e. located on the external surface of the wall of the tank and intended for connecting an external accessory).

The present invention is illustrated in a non-limiting manner by FIGS. 1 to 4, in which identical numbers denote identical elements, namely a movable counter-form (1) secured to a core (not shown), a parison (2) and a mould (3) bearing a form (4).

These figures in fact illustrate four successive steps in moulding a built-in connector according to the invention.

In FIG. 1, the parison is inserted between the form (4) carried by the mould (3) and the counter-form (1) having a screw thread (10) and carried by the core.

In FIG. 2, the parison (2) has been pressed against the mould (3), and the counter-form (1) of the core matches the form (4) of the mould (3).

In FIG. 3, the counter-form has been unscrewed and removed from the mould at the same time as the core. Only the parison (2) remains, which is pressed against the mould (3) in the final moulding of the tank.

Figure 1:
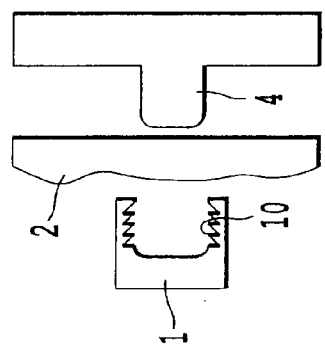
Figure 2:
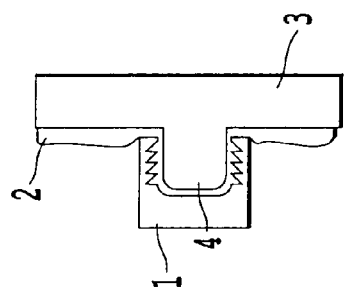
Figure 3:
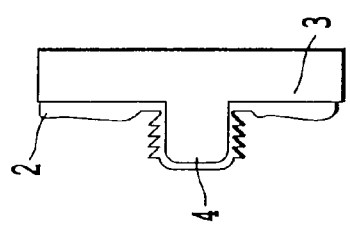
Figure 4:
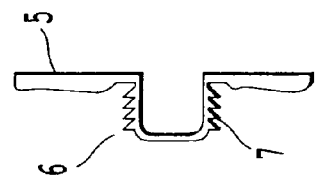
FIG. 4 shows a fraction of the demoulded tank, which includes a smooth outer wall (5) and an internal connector (6) provided with a screw thread (7).
Figure 7B:
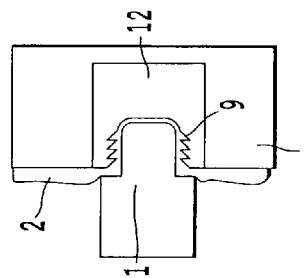
Figure 7A:
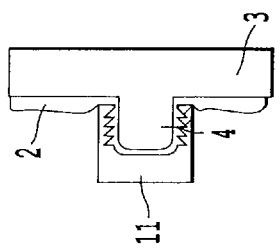
Figure 6:
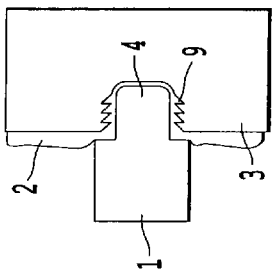
FIG. 6 illustrates the convex form 4 having a screw thread 9.
Figure 5:
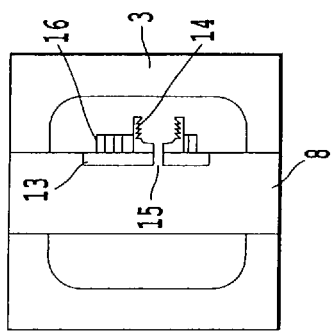
FIG. 5 illustrates a core (8) located inside the mold (3). The core (8) includes (a) a hollow moving piece (13) provided with (i) an internal screw thread (14) and (ii) a suction system (15) and (b) a device (16) for unscrewing the hollow moving piece.

FIGS. 7(a) and 7(b), illustrate the counter-form (1) having an accessory (11) and the form (4) having an accessory (12), respectively.

FIG. 8 illustrates the parison (2) with a barrier layer (17).

FIG. 9a illustrates the first five steps (110, 120, 130, 140, 150) of the method according to an embodiment of the invention.

FIG. 9b illustrates the last four steps (160, 170, 180, 190) of the method according to an embodiment of the invention.

The invention claimed is:

1. A method for manufacturing a plastic fuel tank by moulding a parison in a mould, the method comprising:
  locally deforming the parison during moulding of the parison in order to obtain an impermeable hollow built-in connector provided with a screw thread, and to do so by means of a concave counter-form and a convex form that is able to penetrate the counter-form, these two pieces being secured, one to the mould and the other to a core located inside the mould, or vice versa, and at least one of these pieces being provided with a screw thread, the moulding of the connector taking place by the convex form penetrating the concave counter-form.

2. The method according to claim 1, further comprising the following steps:
   introducing the parison into the mould;
   introducing the core into the mould, inside the parison;
   closing the mould;
   firmly pressing the parison against the mould by blowing through the core and/or by drawing a vacuum behind the mould; and
   moulding the connector by displacing the form within the counter-form.

3. The method according to claim 1, wherein both the farm and the counter-form are provided with a screw thread so that the connector includes both an internal screw thread and an external screw thread.

4. The method according to claim 1, wherein either the form or the counter-form consists of an accessory that it is desired to fasten to the tank.

5. The method according to claim 1, wherein the core includes a hollow moving piece provided with an internal screw thread which acts as counter-form and is unscrewed from the built-in connector once the latter has been moulded.

6. The method according to claim 5, wherein the core is provided with a device for unscrewing the moving piece of the connector before the core is removed from the mould.

7. The method according to claim 5, wherein the moving piece is cooled so as to be able to solidify the material on the surface of the connector and to allow it to be unscrewed without damaging the connector.

8. The method according to claim 5, wherein the moving piece is provided with a suction system.

9. The method according to claim 2, wherein after the connector has been moulded and the counter-form possibly unscrewed, where appropriate, said method further includes the following steps:
   degassing;
   opening the mould to withdraw the core;
   closing the mould again onto the parison and the parison is blown in order to produce the tank; and
   removing the tank from the mould.

10. The method according to claim 1, wherein the parison includes a barrier layer, which is continuous in the connector and at the connector/tank transition.

* * * * *

UNITED STATES PATENT AND TRADEMARK OFFICE
CERTIFICATE OF CORRECTION

PATENT NO. : 7,780,901 B2  Page 1 of 1
APPLICATION NO. : 12/297061
DATED : August 24, 2010
INVENTOR(S) : Hugues Masse et al.

It is certified that error appears in the above-identified patent and that said Letters Patent is hereby corrected as shown below:

Column 7, line 14, claim 3, change "farm" to --form--.

Signed and Sealed this

Twenty-third Day of November, 2010

David J. Kappos
*Director of the United States Patent and Trademark Office*